(12) United States Patent
Yoshida et al.

(10) Patent No.: US 6,565,477 B2
(45) Date of Patent: May 20, 2003

(54) POWER ROLLER ASSEMBLY FOR A TOROIDAL-TYPE CONTINUOUSLY VARIABLE TRANSMISSION

(75) Inventors: Masayuki Yoshida, Kanagawa (JP); Masaaki Fujii, Kanagawa (JP); Nobuo Kino, Kanagawa (JP); Keizo Otani, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 34 days.

(21) Appl. No.: 09/775,565

(22) Filed: Feb. 5, 2001

(65) Prior Publication Data

US 2001/0016533 A1 Aug. 23, 2001

(30) Foreign Application Priority Data

Feb. 7, 2000 (JP) ........................................ 2000-029491

(51) Int. Cl.[7] ............................ F16H 15/38; C23C 22/07
(52) U.S. Cl. ............................ 476/40; 476/46; 384/463; 384/625; 384/907; 384/913
(58) Field of Search ................. 384/462, 463, 384/464, 490, 492, 625, 907, 913; 476/40, 46

(56) References Cited

U.S. PATENT DOCUMENTS

| | | | | | |
|---|---|---|---|---|---|
| 2,257,313 | A | * | 9/1941 | Plummer | 384/913 |
| 2,310,381 | A | * | 2/1943 | Zimmer et al. | 384/625 |
| 3,198,735 | A | * | 8/1965 | Lamson et al. | 384/463 |
| 3,515,599 | A | * | 6/1970 | Connelly | 384/913 |
| 3,547,711 | A | * | 12/1970 | Ashdown | 384/625 |
| 5,150,974 | A | | 9/1992 | Tamada et al. | 384/463 |
| 5,556,348 | A | | 9/1996 | Kokubu et al. | 476/40 |
| 5,830,103 | A | * | 11/1998 | Itoh et al. | 476/40 |
| 6,051,080 | A | | 4/2000 | Kino et al. | 148/319 |

OTHER PUBLICATIONS

Japanese Industrial Standard, "Surface roughness—Definitions and designation", JIS B 0601, UDC 003.62:621.7.015, pp. 1–9, 1994, Japanese Standards Association, Japan.

* cited by examiner

Primary Examiner—William C Joyce
(74) Attorney, Agent, or Firm—Foley & Lardner

(57) ABSTRACT

A power roller assembly for a toroidal-type CVT, including a pair of races formed with bearing surfaces opposed to each other, a plurality of rolling elements rotatably disposed between the races in contact with the bearing surfaces, and an iron phosphate-based coat formed on at least one of bearing surfaces.

23 Claims, 3 Drawing Sheets

LUBRICATING OIL

POWER ROLLER ASSEMBLY FOR A TOROIDAL-TYPE CONTINUOUSLY VARIABLE TRANSMISSION

FIELD OF THE INVENTION

This invention relates to a continuously variable transmission (CVT) such as a toroidal-type CVT, which is used to transmit rotation from an input side to an output side while continuously varying the speed by traction drive in vehicles such as automobiles, industrial machinery and so forth, and more particularly to an improved power roller assembly useable in the continuously variable transmission.

BACKGROUND OF THE INVENTION

In general, the toroidal-type CVT includes an input disk on an input shaft, an output disk on an output shaft coaxial with the input shaft, and a pair of power roller assemblies adapted for transmitting motive power of the input shaft to the output shaft. The input and output disks are opposed to each other and have traction surfaces defining a toroidal cavity. The power roller assemblies are rotatably disposed within the toroidal cavity. Each power roller assembly includes rolling elements such as balls and a pair of races contacted with the rolling elements, one of the races having a traction surface contacted with the traction surfaces of the input and output disks. The race is rotatable about a first pivot positioned at the center thereof and pivotable about a second pivot positioned at the center of the toroidal cavity of the input and output disks when viewed in section taken along a common axis of the input and output shafts.

U.S. Pat. No. 5,556,348 discloses a toroidal-type CVT includes input and output disks and a power roller assembly disposed between the input and output disks. The power roller assembly includes a power roller engaging the input and output disks and acting as one of a pair of races of a ball bearing. The input and output disks and the power roller are subjected to surface-hardening and grinding so as to have effective carburized depths in a range of 2.0–4.0 mm for the purposes of improvement in rolling contact lives of traction surfaces of the input and output disks and power roller and in fatigue fracture lives of the input and output disks and power roller.

U.S. Pat. No. 5,510,974 discloses a grease-sealed bearing including rolling elements and rings having rolling surfaces which are in contact with the rolling elements and formed with iron oxide layers. This technique contemplates to eliminate the catalytic action of the rolling surface which will occur under high-temperature and high-pressure conditions during high-speed rotation of the rolling elements, and to suppress the chemical decomposition of grease used in the bearing which may be caused by the catalytic action. This attempts to prevent production of hydrogen infiltrating into a metal of the rings to cause embrittlement thereof. The iron oxide layers are formed by blackening treatment in which the rings are immersed in a caustic soda solution heated at 130° C.-160° C.

U.S. Pat. No. 6,051,080 discloses one of races of a power roller assembly for a toroidal-type CVT. The race is adapted to be in contact with input and output disks of the CVT and has a groove for receiving balls and forming a bearing surface. This technique contemplates to reduce the loss of a hardened layer caused by grinding conducted after surface-hardening of the race to thereby improve durability of the bearing surface of the race. The bearing surface has a carbon concentration not lower than that of a back surface opposed to the bearing surface. The bearing surface also has a hardened layer an effective depth of which is not smaller than that of the back surface.

SUMMARY OF THE INVENTION

When the conventional toroidal-type CVT is driven, a high load is applied to the traction surfaces of the input and output disks and the traction surfaces of the races of the power roller assemblies. This will cause a high contact pressure exerted on the bearing surfaces of the races of each power roller assembly which are in rolling contact with the rolling elements such as steel balls. At this time, the maximum contact pressure may be not less than 3 GPa. Further, unlike the case of usual ball-and-roller bearings, traction force and radial load are applied onto the bearing surfaces of the races of the power roller assembly when the rolling elements roll on the bearing surfaces. This may cause microscopic metal-to-metal contact between the bearing surfaces and the rolling elements or increase rolling-friction resistance generated therebetween, whereby tangential force applied onto the bearing surfaces will become large so that rolling-fatigue lives of the bearing surfaces will be lowered.

There is a demand for reducing the microscopic metal-to-metal contact and rolling-friction resistance caused between the rolling elements and the bearing surfaces of the races of the power roller assembly of the toroidal-type CVT to thereby improve the rolling-fatigue lives of the bearing surfaces thereof. In addition, the blackening treatment using the caustic soda solution as disclosed in the above-described conventional technique will make adverse influence on working environment and therefore it is industrially undesirable.

An object of the present invention is to provide a power roller assembly useable in a toroidal-type continuously variable transmission (CVT) which is improved in lubricating oil retention on bearing surfaces of a pair of races which are in contact with rolling elements, and capable of preventing the metal-to-metal contact and reducing rolling-friction resistance caused on the bearing surfaces upon operation of the toroidal-type CVT, then improving the rolling-fatigue lives of the bearing surfaces.

According to one aspect of the present invention, there is provided a power roller assembly for use in a continuously variable transmission, comprising:

a first race formed with a first bearing surface;

a second race spaced from the first race, the second race being formed with a second bearing surface opposed to the first bearing surface;

a plurality of rolling elements rolling between the first and second races, the rolling elements being in contact with the first and second bearing surfaces; and an iron phosphate-based coat formed on at least one of the first and second bearing surfaces.

According to a further aspect of the present invention, there is provided a toroidal-type continuously variable transmission, comprising:

a pair of disks arranged in a coaxial and spaced relation to each other, the disks cooperating to form a toroidal cavity therebetween; and a power roller assembly rotatably disposed within the toroidal cavity, the power roller assembly having a pivot positioned at a center of the toroidal cavity, the power roller assembly comprising:

first and second races formed with first and second bearing surfaces opposed to each other;

a plurality of rolling elements rotatable between the first and second races, the rolling elements being in contact with the first and second bearing surfaces, and an iron phosphate-based coat formed on at least one of the first and second bearing surfaces.

According to a still further aspect of the present invention, there is provided a method of producing a power roller assembly for use in a toroidal-type continuously variable transmission, the power roller assembly comprising a pair of races formed with bearing surfaces, respectively, a plurality of rolling elements in contact with the bearing surfaces, and an iron phosphate-based coat formed on the bearing surface of at least one of the races, the method comprising:

subjecting a workpiece to forging and rough machining to form a preform;

subjecting the preform to surface-hardening;

subjecting the surface-hardened preform to grinding and superfinishing to provide the races formed with the bearing surfaces;

cleaning the bearing surface of at least one of the races with a cleaning agent solution; and immersing the cleaned bearing surface in a surface-treatment agent solution containing phosphorus to form the iron phosphate-based coat on the bearing surface.

DESCRIPTION OF THE PREFERRED EMBODIMENT

Figure 1:
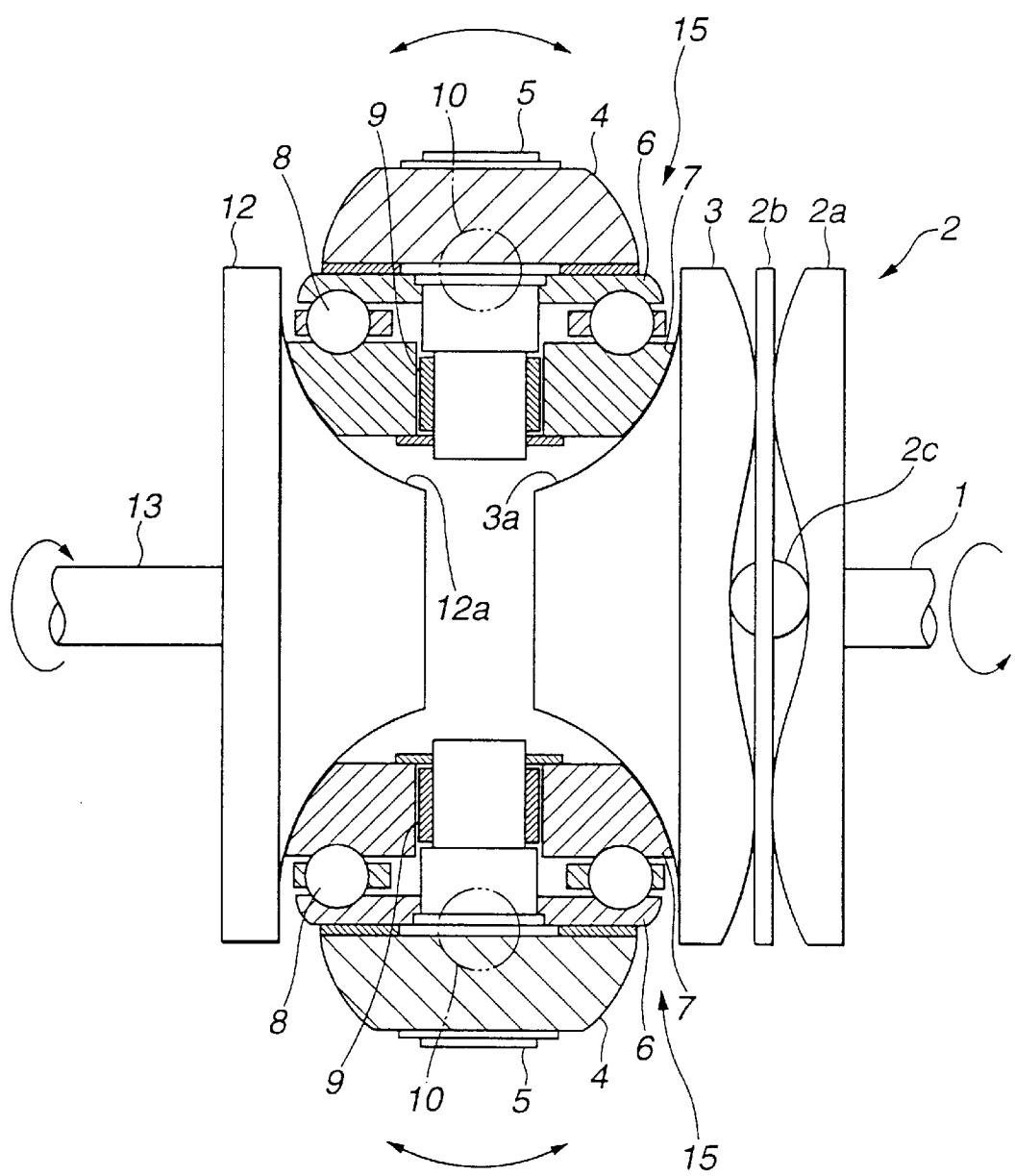
FIG. 1 is a sectional view of a part of a toroidal-type continuously variable transmission (CVT) to which a power roller assembly of a preferred embodiment, according to the present invention, can be applied.

Referring now to FIG. 1, there is shown a toroidal-type continuously variable transmission (CVT) to which a power roller assembly of a preferred embodiment, according to the present invention, can be applied.

As illustrated in FIG. 1, the toroidal-type CVT includes input disk 3 connected with input shaft 1 through loading cam device 2 that includes cam plate 2a, retainer 2b and cam roller 2c. Output disk 12 is fixed to output shaft 13 axially aligned with input shaft 1. Input disk 3 and output disk 12 are thus arranged in coaxial relation to each other within a housing, not shown. Input disk 3 and output disk 12 have substantially the same shape and are symmetrically disposed as shown in FIG. 1. Input disk 3 and output disk 12 have axially opposed traction surfaces 3a and 12a forming a toroidal surface. The toroidal surface defines a toroidal cavity having a generally semicircular-shaped section taken along the common axis of input and output disks 3 and 12. A pair of power roller assemblies 15, 15 are disposed within the toroidal cavity in contact with traction surfaces 3a and 12a of input and output disks 3 and 12.

Figure 2:
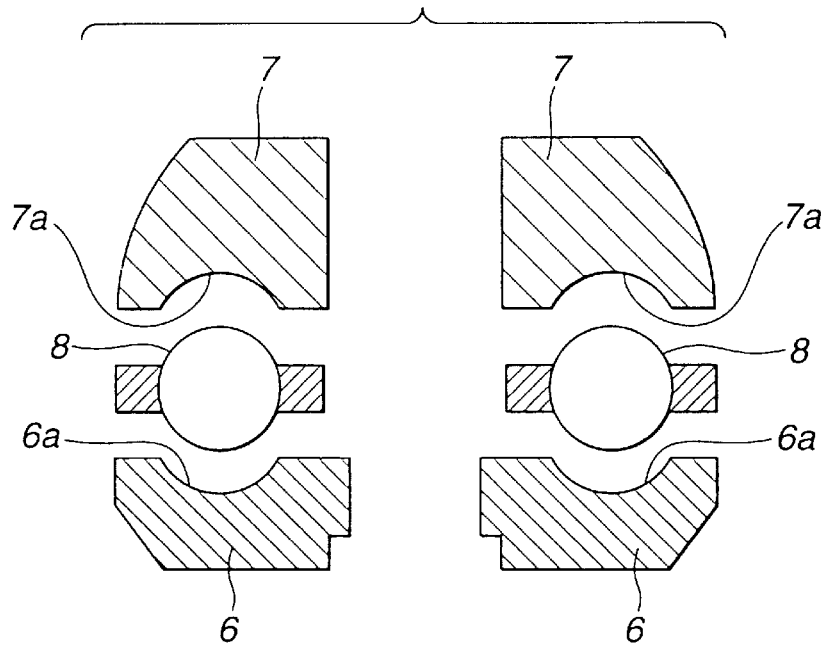
FIG. 2 is an enlarged exploded view of the power roller assembly shown in FIG. 1, showing a pair of races and a rolling element therebetween.

Each power roller assembly 15 includes outer race 6 supported by trunnion 4, inner race 7 opposed to and spaced from outer race 6, and a plurality of rolling elements 8 received in grooves that are formed on outer and inner races 6 and 7 in opposed manner. Specifically, as illustrated in FIG. 2, outer race 6 and inner race 7 have bearing surfaces 6a and 7a to be in contact with the rolling elements 8. Bearing surfaces 6a and 7a form the annular grooves receiving the rolling elements 8, respectively. Rolling elements 8 are in the form of steel balls. Outer race 6 and inner race 7 are thus contacted with each other through rolling elements 8. Referring back to FIG. 1, inner race 7 is rotatably supported on pivot 5 mounted to trunnion 4, through needle bearing 9. Inner race 7 also is pivotable about pivot 10 that is positioned at the center of the toroidal cavity formed by input disk 3 and output disk 12 when viewed in section taken along the common axis of input and output disks 3 and 12.

Traction surfaces 3a and 12a of input disk 3 and output disk 12 and traction surfaces of inner races 7, 7 of power roller assemblies 15, 15 which are in contact with traction surfaces 3a and 12a are supplied with a lubricating oil (traction oil) having large viscous-frictional resistance, so that a lubricating oil film is formed between the mutually contacted traction surfaces thereof. Motive power applied to input disk 3 is transmitted to output disk 12 through the lubricating oil film and the inner races 7, 7.

When input shaft 1 rotates, the motive power thereof is transmitted to input disk 3 via loading cam device 2 to thereby rotate input disk 3. The rotation of input disk 3 is transmitted to output disk 12 via inner races 7, 7 of power roller assemblies 15, 15 so that output disk 12 rotates with output shaft 13. Upon changing the speed, as indicated by arrows in FIG. 1, trunnions 4, 4 are rotated about pivot 10 by a predetermined angle so as to slantly move inner races 7, 7 relative to input and output disks 3 and 12. Inner races 7, 7 thus move on traction surfaces 3a and 12a of input and output disks 3 and 12. As a result, the contact between the traction surfaces of inner races 7, 7 and traction surfaces 3a and 12a of input and output disks 3 and 12 is displaced. Namely, the effective radiuses of input and output disks 3 and 12 vary, so that the speed ratio varies continuously to accelerate or decelerate the vehicle.

Figure 4:
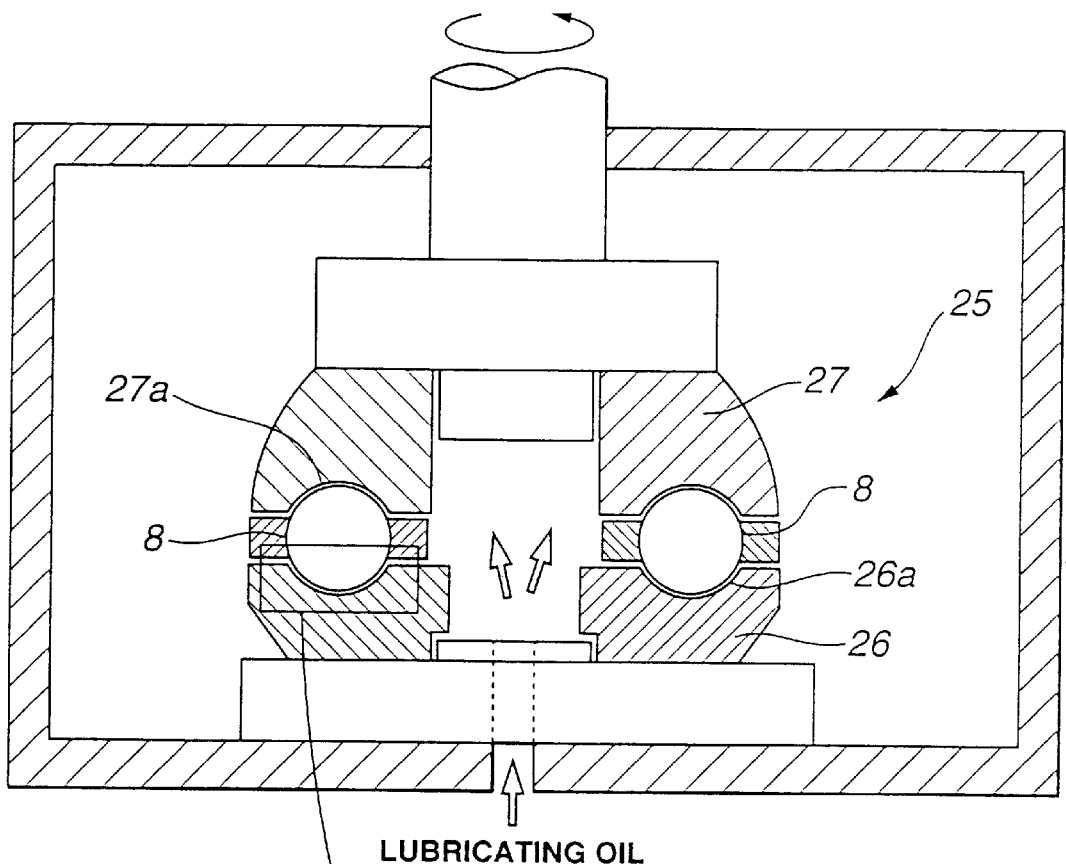
FIG. 4 is a sectional view showing the power roller assembly of the embodiment of the invention and a bearing rolling-fatigue tester used for measuring rolling-fatigue strength of the power roller assembly of the embodiment.
Figure 5:
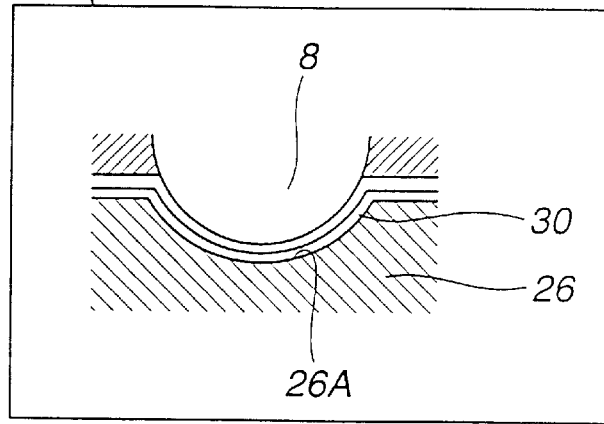
FIG. 5 is an enlarged view of a part enclosed in a square as shown in FIG. 4.

Referring to FIGS. 4–5, a preferred embodiment of a power roller assembly useable in a toroidal-type CVT, according to the present invention, is explained. Power roller assembly 25 of the embodiment has the same basic structure as that of the above-described power roller assembly 15 except that at least one of outer and inner races 26 and 27 has iron phosphate-based coat 30 formed on an outer surface thereof. Races 26 and 27 are similar in configuration to races 6 and 7 of power roller assembly 15. In this embodiment, iron phosphate-based coat 30 is so formed as to cover the whole outer surface of each of outer and inner races 26 and 27 of power roller assembly 25. Alternatively, iron phosphate-based coat 30 may be formed to cover only bearing surface 26a and 27a of each race 26 and 27 which comes into rolling contact with rolling elements 8 upon operation of power roller assembly 25. The formation of iron phosphate-based coat 30 can improve lubricating oil retention property of bearing surface 26a and 27a, and can minimize microscopic metal-to-metal contact between bearing surface 26a and 27a and rolling elements 8 and lower rolling-friction resistance caused thereon. This can result in improving the rolling-fatigue lives of races 26 and 27 and then the life of power roller assembly 25.

In general, either one of the races of the power roller assembly suffers from fatigue failure earlier than the other of the races. Therefore, the iron phosphate-based coat may be formed on only the bearing surface of one of the races which tends to be earlier in fatigue failure. In such the case, the cost performance can be enhanced. If the iron phosphate-based coats are formed on the bearing surfaces of both of the races, the effects as described above can be certainly exhibited.

Each of races 26 and 27 of power roller assembly 25 is produced by the following method. First, a workpiece is subjected to forging and rough machining to form a preform having a generally ring shape. The preform is subjected to surface-hardening and then to grinding and superfinishing to provide race 26 and 27 with bearing surface 26a and 27a that receives rolling elements 8.

Next, bearing surface 26a and 27a of at least one of races 26 and 27 is cleaned out with a solvent- or alkali-based cleaning agent solution and washed with water. Bearing surface 26a and 27a is then subjected to a surface treatment using an aqueous solution of a phosphorus-containing agent for a chemical conversion treatment, to thereby form iron phosphate-based coat 30 on bearing surface 26a and 27a. Namely, bearing surface 26a and 27a is immersed in the surface-treatment agent solution. Subsequent to the immersion, bearing surface 26a and 27a is washed with water to remove the residual surface-treatment agent solution remaining unreacted on bearing surface 26a and 27a. After washing, bearing surface 26a and 27a is dried. Thus, race 26 and 27 with iron phosphate-based coat 30 covering bearing surface 26a and 27a is produced.

Upon the formation of iron phosphate-based coat 30 on each race 26 and 27, it is preferable to conduct a chemical conversion treatment using aqueous agents because such a treatment contributes to industrial cost-saving. The entire outer surface of race 26 and 27 can be immersed in the surface-treatment agent solution. Alternatively, since an area of the outer surface of race 26 and 27 which acts as the traction surface is not required to be covered with iron phosphate-based coat 30, the area can be subjected to masking before the surface treatment. Further, the area covered with iron phosphate-based coat 30 can be subjected to regrinding such that iron phosphate-based coat 30 is removed therefrom, if required.

An amount of iron phosphate-based coat 30 is preferably in a range of 100–300 mg/m$^2$ in terms of phosphorus. If the amount of iron phosphate-based coat 30 is less than 100 mg/m$^2$, the wear resistance property of iron phosphate-based coat 30 cannot be obtained at a sufficient level so that the excellent characteristics of iron phosphate-based coat 30 cannot be continuously exhibited. If the amount of phosphorus is more than 300 mg/m$^2$, the surface roughness of the surface formed with iron phosphate-based coat 30 tends to be larger. The amount of phosphorus can be measured using a commercial X-ray fluorescence analysis apparatus. Namely, a plurality of samples that are different in content of phosphorus are subjected to the X-ray fluorescence analysis to obtain a relationship between the characteristic X-ray intensity and the content of phosphorus. A calibration curve of phosphorus is made on the basis of the relationship obtained. Next, specimens are subjected to the X-ray fluorescence analysis under the same conditions to measure the characteristic X-ray intensity. The measured characteristic X-ray intensity can be calculated in terms of the content of phosphorus in each specimen on the basis of the calibration curve of phosphorus.

It is preferable that iron phosphate-based coat 30 contains a molybdenum oxide. Therefore, the surface-treatment agent solution used for forming iron phosphate-based coat 30 contains molybdenum. This is because the molybdenum oxide is effective to improve the wear resistance of iron phosphate-based coat 30, which enables iron phosphate-based coat 30 to continuously exhibit the excellent characteristics. The weight ratio (Mo/P) of molybdenum to phosphorus both present in iron phosphate-based coat 30 is preferably not more than 0.3 in order to assure the adhesion property of iron phosphate-based coat 30 relative to the surface of race 26 and 27 as the workpiece. An amount of the molybdenum oxide contained in iron phosphate-based coat 30 is preferably not more than 60 mg/m$^2$ in terms of molybdenum in order to assure the surface smoothness of iron phosphate-based coat 30 and the adhesion property thereof relative to the outer surface of race 26 and 27. The molybdenum contained in iron phosphate-based coat 30 can be calculated in the same manner as used for the calculation of the phosphorus content as explained above. Namely, samples that are different in molybdenum content from each other are subjected to the X-ray fluorescence analysis to obtain a relationship between the characteristic X-ray intensity and the molybdenum content. A calibration curve of molybdenum is prepared on the basis of the relationship obtained. Specimens to be tested then are subjected to the X-ray fluorescence analysis under the same conditions to measure the characteristic X-ray intensity. The measured characteristic X-ray intensity can be calculated in terms of the molybdenum contained in each specimen on the basis of the calibration curve of molybdenum.

Further, bearing surface 26a and 27a covered with iron phosphate-based coat 30 has such a surface roughness preferably expressed by an arithmetical mean roughness (Ra) of not more than 0.07 μm when measured according to JIS B 0601. If the arithmetical mean roughness (Ra) is more than 0.07 μm, a rate of the metal-to-metal contact between bearing surface 26a and 27a and rolling elements 8 becomes higher upon operation of power roller assembly 25. This tends to raise a temperature on bearing surface 26a and 27a to thereby soften the material of bearing surface 26a and 27a or cause damage on an outer periphery of bearing surface 26a and 27a, resulting in reducing the life due to the rolling fatigue starting from the outer periphery of bearing surface 26a and 27a. The surface roughness of bearing surface 26a and 27a can be measured using a commercial tracer-type surface roughness tester at a cutoff of 0.08 mm.

Furthermore, it is preferable that a thickness of iron phosphate-based coat 30 is in a range of 0.4–2.0 μm. If the thickness of iron phosphate-based coat 30 is smaller than 0.4 μm, the sufficient wear resistance of iron phosphate-based coat 30 cannot be exhibited. If the thickness of iron phosphate-based coat 30 is larger than 2.0 μm, the surface smoothness of iron phosphate-based coat 30 tends to be lowered. The thickness of iron phosphate-based coat 30 can be measured using a commercial X-ray photoelectric-spectral analysis (XPS) apparatus. The XPS apparatus analyzes photoelectron emitted when a sample is excited by irradiation of X-rays under ultra-high vacuum ($10^{-5}$ Pa or less). A ratio between atoms respectively present on the surface of the sample can be calculated on the basis of a relationship between intensity of the photoelectron and sensitivity coefficient. Also, chemical state, for instance, iron oxidation state (metal state or oxidized state), of the surface of the sample can be determined on the basis of kinetic energy of the photoelectron. The quantitative determination or calculation method has been already established and the software program thereof is commercially available.

Specifically, the material of race 26 and 27 of power roller assembly 25 is excited by irradiation of X-rays and then subjected to a so-called wide scan analysis to analyze qualitatives of elements of the respective atoms present on the outer surface of race 26 and 27. Carbon (produced due to contamination by atmosphere), oxygen, phosphorus and iron (in an oxidized state) are usually detected and in some cases, molybdenum may also be detected. Quantitative determination of the elements is made by calculating ratios of the elements by atomic percent based on values detected by the qualitative analysis. The thickness of iron phosphate-based coat 30 can be calculated based on values measured by the photoelectric analysis using an argon sputtering gun installed in the XPS apparatus. First, a plurality of samples each having iron phosphate-based coats having different thicknesses that are measured using apparatuses such as a transmission electron microscope, are subjected to the argon sputtering-photoelectric analysis to prepare a calibration curve of the iron phosphate-based coat. The coat is gradually removed by repeatedly conducting the sputtering, to detect the metal-state iron present in the steel as the raw material of the samples. Here, the coat removed from the surface of each sample until the amount of metal-state iron sputtered reaches 60 atomic percent is defined as a coat to be measured, to thereby calculate the accumulated sputtering time required for detecting the 60 atomic percent metal-state iron and measure the thickness of the coat removed. The calibration curve of the coat is made on the basis of a relationship between the accumulated sputtering time and the thickness of the coat removed. Next, a specimen with an iron phosphate-based coat is subjected to the argon sputtering-photoelectric analysis to calculate the accumulated sputtering time required for detecting the 60 atomic percent metal-state iron. The thickness of the iron phosphate-based coat of the specimen is calculated on the basis of the calibration curve prepared using the samples as described above.

Meanwhile, the amount of phosphorus, the amount of molybdenum and the thickness of iron phosphate-based coat can be controlled by adjusting various conditions of the chemical conversion treatment, for instance, composition and concentration of the treatment agent solution, treatment temperature and time, and the like.

EXAMPLES

The present invention is described in more detail by way of examples by referring to the accompanying drawings. However, these examples are only illustrative and not intended to limit a scope of the present invention thereto.

Example 1

Each of the pair of races 26 and 27, covered with iron phosphate-based coat 30, of the power roller assembly 25 as described in the embodiment was produced in the following manner.

A workpiece made of a Cr—Mo steel generally used for carburization, having a chemical composition as shown in Table 1, was subjected to forging and rough machining to prepare a generally ring-shaped preform.

TABLE 1

| Steel Kind | Chemical Composition (wt %) | | | | | | |
|---|---|---|---|---|---|---|---|
| | C | Si | Mn | Cr | Mo | P | S |
| Cr—Mo steel | 0.2 | 0.25 | 0.8 | 1.1 | 0.15 | 0.015 | 0.009 |

Figure 3:
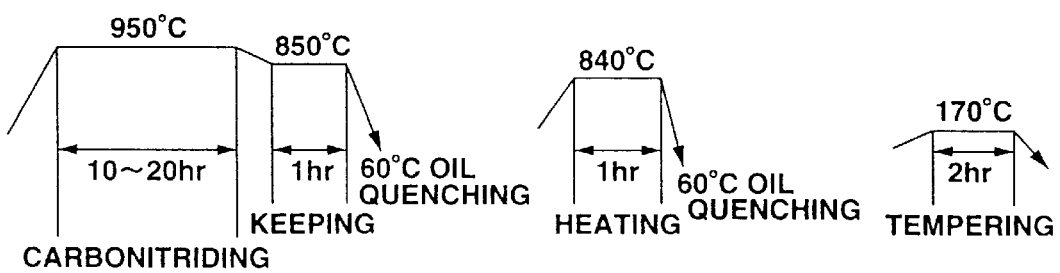
FIG. 3 is a schematic diagram showing a production process of producing the races of the embodiment of the present invention, which is conducted before a surface treatment.

The preform was then subjected to surface-hardening as shown in FIG. 3. First, the preform was subjected to carbonitriding at 950° C. for 10–20 hours and kept at 850° C. for 1 hour and then subjected to oil-quenching in a 60° C. oil. Subsequently, the preform was heated at 840° C. for 1 hour and subjected to oil-quenching in a 60° C. oil. The preform was then subjected to tempering at 170° C. for two hours.

Next, the thus surface-hardened preform was subjected to grinding and superfinishing so as to be formed with an annular groove for receiving rolling elements 8, on an end surface thereof. Each of races 26 and 27 having bearing surfaces 26*a* and 27*a*, respectively, was thus produced. The grinding and superfinishing was carried out such that the surface hardness of bearing surface 26*a* and 27*a* was substantially in a range of a Vickers hardness of Hv700–720 and the surface roughness was in such a range that arithmetical mean roughness (Ra) was substantially 0.03–0.05 μm.

Thus-provided races 26 and 27 were subjected to the following surface treatment for forming iron phosphate-based coats 30 thereon. Races 26 and 27 were cleaned out by being immersed in a 2% aqueous solution of the commercial degreaser, "FINECLEANER 4360 (registered trademark)", manufactured by Nihon Parkerizing Co., Ltd., preheated at 60° C. for five minutes. After the cleaning, races 26 and 27 were sufficiently washed with water to clean out the surfaces thereof. Thus-cleaned races 26 and 27 were immersed in an 8% aqueous solution of the commercial agent for initial make-up of electrolytic bath, "PALFOS 1077 (registered trademark)", manufactured by Nihon Parkerizing Co., Ltd., preheated at 50° C. for one minute. Upon the immersion, an iron phosphate-based coat was formed on the whole outer surface of each of races 26 and 27 including bearing surfaces 26*a* and 27*a*, respectively. Races 26 and 27 with the iron phosphate-based coats were sufficiently washed with water to remove the residual agent solution remaining in unreacted state on the outer surface thereof. Next, races 26 and 27 were dried within a hot-air drying furnace set at 100° C., for 15 minutes. Races 26 and 27 formed with iron phosphate-based coats 30 were thus produced.

Thus-produced races 26 and 27 were subjected to measurement of a surface roughness of bearing surfaces 26*a* and 27*a*. The measurement was conducted using a commercial tracer-type surface roughness tester at a cutoff 0.8 mm. After that, races 26 and 27 were subjected to measurement of a thickness of each iron phosphate-based coat 30 by using the above-discussed commercial XPS apparatus with the argon-sputtering gun. The thickness of iron phosphate-based coat 30 was calculated by the above-described quantitative determination method based on the sputtering time required upon the removal of the coat. Subsequently, the amount of phosphorus was calculated based on values measured by the commercial X-ray fluorescence analysis apparatus as explained above.

Next, races 26 and 27 were set in a bearing rolling-fatigue tester as shown in FIG. 4 and then subjected to a fatigue test to estimate rolling-fatigue lives of bearing surfaces 26*a* and 27*a*. The test condition was the maximum contact pressure of 3.4 GPa under forced lubrication of 3 L/min and a vibration sensor was used to detect vibration of races 26 and 27 during the rolling. The rolling-fatigue lives of bearing surfaces 26a and 27a were defined as the test time required for causing flake on either one of bearing surfaces 26a and 27a.

The results of the above measurements and test are shown in Table 2.

Example 2

Races 26 and 27 were produced using the same steel and method as described in Example 1. Subsequently, iron phosphate-based coat 30 was formed on the outer surface of each race 26 and 27 in the same manner as described in Example 1, except that the immersion time for immersing races 26 and 27 in the surface-treatment agent solution was three minutes.

Thus-produced races 26 and 27 were measured and tested in the same manner as described in Example 1. The results of the measurements and test are shown in Table 2.

Example 3

Races 26 and 27 were produced using the same steel and method as described in Example 1. Iron phosphate-based coat 30 containing a molybdenum oxide was formed on the outer surface of each race 26 and 27 in the same manner as described in Example 1, except that after cleaning by degreasing, races 26 and 27 were immersed in a 12% aqueous solution of a molybdenum-containing bath forming agent (agent for initial make-up of electrolytic bath; "PALFOS 3480 (registered trademark)" manufactured by Nihon Parkerizing Co., Ltd.) preheated at 65° C., for ten minutes.

Thus-produced races 26 and 27 were measured in the same manner as described in Example 1. Further, an amount of molybdenum and the weight ratio (Mo/P) of molybdenum to phosphorus both present in iron phosphate-based coat 30 were measured. Races 26 and 27 were then tested in the same manner as described in Example 1. The results of the measurements and test are shown in Table 2.

Example 4

Races 26 and 27 were produced using the same steel and method as described in Example 1. Iron phosphate-based coat 30 containing a molybdenum oxide was formed on the outer surface of each race 26 and 27 in the same manner as described in Example 1, except that after cleaning by degreasing, races 26 and 27 were immersed in a 24% aqueous solution of a molybdenum-containing bath forming agent ("PALFOS 3480 (registered trademark)" manufactured by Nihon Parkerizing Co., Ltd.) preheated at 65° C., for ten minutes.

Thus-produced races 26 and 27 were measured in the same manner as described in Example 3. Then, races 26 and 27 were tested in the same manner as described in Example 1. The results of the measurements and test are shown in Table 2.

Example 5

Races 26 and 27 were produced using the same steel and method as described in Example 1. Iron phosphate-based coat 30 containing a molybdenum oxide was formed on the outer surface of each race 26 and 27 in the same manner as described in Example 1, except that after cleaning by degreasing, races 26 and 27 were immersed in a solution prepared by admixing 1.5 g/L of a phosphoric acid with a 24% aqueous solution of a molybdenum-containing bath forming agent ("PALFOS 3480 (registered trademark)" manufactured by Nihon Parkerizing Co., Ltd.) preheated at 65° C., for ten minutes.

Thus-produced races 26 and 27 were measured in the same manner as described in Example 3. Then, races 26 and 27 were tested in the same manner as described in Example 1. The results of the measurements and test are shown in Table 2.

Example 6

Races 26 and 27 were produced using the same steel and method as described in Example 1. Iron phosphate-based coat 30 was formed on the outer surface of each race 26 and 27 in the same manner as described in Example 1, except that after cleaning by degreasing, races 26 and 27 were immersed in a solution having a pH 3.8, which was prepared by admixing a caustic soda with a 3% aqueous solution of a phosphoric acid and preheated at 50° C., for three minutes.

Thus-produced races 26 and 27 were measured and tested in the same manner as described in Example 1. The results of the measurements and test are shown in Table 2.

Comparative Example 1

A pair of races 6 and 7 as shown in FIG. 2 were produced using the same steel and method as described in Example 1, except that races 6 and 7 were not subjected to the surface treatment and no iron phosphate-based coat was formed on the outer surfaces of races 6 and 7.

Thus-produced races 6 and 7 were tested in the same manner as described in Example 1. The results of the test are shown in Table 2.

Comparative Example 2

A pair of races 6 and 7 as shown in FIG. 2 were produced using the same steel and method as described in Example 1. Races 6 and 7 were subjected to the same surface treatment as described in Example 1, except that after cleaning by degreasing, races 6 and 7 were immersed in an aqueous solution of a caustic soda, preheated at 150° C., for five minutes to thereby form tri-iron tetroxide coats on the outer surfaces of races 6 and 7.

Thus-produced races 6 and 7 were tested in the same manner as described in Example 1. The results of the test are shown in Table 2.

TABLE 2

| Example | Surface roughness Ra ($\mu$m) | Iron phosphate-based coat thickness ($\mu$m) | P (mg/m$^2$) | Mo (mg/m$^2$) | Mo/P (mg/m$^2$) | Life (hour) |
|---|---|---|---|---|---|---|
| Ex. 1 | 0.04 | 0.6 | 103 | — | — | 153 |
| Ex. 2 | 0.05 | 0.8 | 137 | — | — | 184 |
| Ex. 3 | 0.05 | 0.9 | 151 | 23 | 0.15 | 247 |
| Ex. 4 | 0.06 | 1.6 | 250 | 34 | 0.14 | 281 |
| Ex. 5 | 0.09 | 2.3 | 348 | 72 | 0.21 | 110 |
| Ex. 6 | 0.04 | 0.3 | 42 | — | — | 103 |
| Com. Ex. 1 | 0.04 | — | — | — | — | 52 |
| Com. Ex. 2 | 0.06 | — | — | — | — | 69 |

As seen from Table 2, races 26 and 27 having iron phosphate-based coat 30 on bearing surfaces 26a and 27a as described in Examples 1–6 exhibit remarkably longer rolling-fatigue lives than those described in Comparative Examples 1 and 2. It has been recognized that power roller assembly 25 including races 26 and 27 formed with iron phosphate-based coat 30 and the toroidal-type CVT utilizing the power roller assembly 25 can exhibit the enhanced oil-retention property, reduced microscopic metal-to-metal contact, and low frictional resistance of bearing surfaces 26a and 27a, and thus the improved rolling-fatigue life.

This application is based on Japanese Patent Application No. 2000-029491, filed on Feb. 7, 2000, the entire contents of which, inclusive of the specification, claims and drawings, are hereby incorporated by reference herein.

Although the invention has been described above by reference to the certain embodiment and examples of the invention, the invention is not limited to the embodiment and examples described above. Modifications and variations of the embodiment and examples described above will occur to those skilled in the art, in light of the above teachings. The scope of the invention is defined with reference to the following claims.

What is claimed is:

1. A power roller assembly for use in a continuously variable transmission, comprising:
   a first race formed with a first bearing surface;
   a second race spaced from the first race, the second race being formed with a second bearing surface opposed to the first bearing surface;
   a plurality of rolling elements rolling between the first and second races, the rolling elements being in contact with the first and second bearing surfaces; and
   an iron phosphate-based coat formed on at least one of the first and second bearing surfaces, the iron phosphate-based coat comprising a molybdenum oxide,
   wherein a weight ratio of molybdenum to phosphorus which are present in the iron phosphate-based coat, is not more than 0.3.

2. A power roller assembly for use in a continuously variable transmission, comprising:
   a first race formed with a first bearing surface;
   a second race spaced from the first race, the second race being formed with a second bearing surface opposed to the first bearing surface;
   a plurality of rolling elements rolling between the first and second races, the rolling elements being in contact with the first and second bearing surfaces; and
   an iron phosphate-based coat formed on at least one of the first and second bearing surfaces, the iron phosphate-based coat comprising a molybdenum oxide,
   wherein an amount of the molybdenum oxide contained in the iron phosphate-based coat is not more than 60 mg/m$^2$ in terms of molybdenum.

3. A power roller assembly for use in a continuously variable transmission, comprising:
   a first race formed with a first bearing surface;
   a second race spaced from the first race, the second race being formed with a second bearing surface opposed to the first bearing surface;
   a plurality of rolling elements rolling between the first and second races, the rolling elements being in contact with the first and second bearing surfaces; and
   an iron phosphate-based coat formed on at least one of the first and second bearing surfaces,
   wherein a surface roughness of the bearing surface with the iron phosphate-based coat is expressed by an arithmetical mean roughness (Ra) of not more than 0.07 μm.

4. A power roller assembly as claimed in claim 3, wherein a thickness of the iron phosphate-based coat is in a range of 0.4–2.0 μm.

5. A method of producing a power roller assembly according to claim 3, the method comprising:
   subjecting a workpiece to forging and rough machining to form a preform;
   subjecting the surface-hardened preform to grinding and superfinishing to provide the races formed with the bearing surfaces;
   cleaning the bearing surface of at least one of the races with a cleaning agent solution; and
   immersing the cleaned bearing surface in a surface-treatment agent solution containing phosphorous to form the iron phosphate-based coat on the bearing surface.

6. A method as claimed in claim 5, wherein the iron phosphate-based coat is in a range of 100–300 mg/m$^2$ in terms of phosphorus.

7. A method as claimed in claim 5, wherein the surface-treatment agent solution comprises molybdenum and the iron phosphate-based coat comprises a molybdenum oxide.

8. A method as claimed in claim 7, wherein a weight ratio of molybdenum to phosphorus which are present in the iron phosphate-based coat, is not more than 0.3.

9. A method as claimed in claim 7, wherein an amount of the molybdenum oxide contained in the iron phosphate-based coat, is not more than 60 mg/m$^2$ in terms of molybdenum.

10. A method as claimed in claim 5, wherein a surface roughness of the bearing surface is expressed by an arithmetical mean roughness (Ra) of not more than 0.07 μm.

11. A method as claimed in claim 5, wherein a thickness of the iron phosphate-based coat is in a range of 0.4–2.0 μm.

12. A method as claimed in claim 5, wherein the cleaning agent solution is a degreasing agent solution.

13. A method as claimed in claim 5, wherein the cleaning comprises immersing the bearing surface in the cleaning agent solution and then washing the bearing surface with water.

14. A method as claimed in claim 5, further comprising, after immersing, washing the bearing surface with water to remove the surface-treatment agent solution remaining on the bearing surface.

15. A method as claimed in claim 5, further comprising drying the bearing surface after the immersion.

16. A power roller assembly as claimed in claim 3, wherein the amount of iron phosphate-based coat is in a range of 100–300 mg/m$^2$ in terms of phosphorus.

17. A power roller assembly as claimed in claim 3, wherein the iron phosphate-based coat comprises a molybdenum oxide.

18. A toroidal-type continuously variable transmission, comprising:
    a pair of disks arranged in a coaxial and spaced relation to each other, the disks cooperating to form a toroidal cavity therebetween; and
    a power roller assembly rotatably disposed within the toroidal cavity, the power roller assembly having a pivot positioned at a center of the toroidal cavity, the power roller assembly comprising:
      first and second races formed with first and second bearing surfaces opposed to each other;
      a plurality of rolling elements rotatable between the first and second races, the rolling elements being in contact with the first and second bearing surfaces, and an iron phosphate-based coat formed on at least one of the first and second bearing surfaces, the iron phosphate-based coat comprising a molybdenum oxide, wherein a weight ratio of molybdenum to phosphorus which are present in the iron phosphate-based coat, is not more than 0.3.

19. A toroidal-type continuously variable transmission, comprising:

a pair of disks arranged in a coaxial and spaced relation to each other, the disks cooperating to form a toroidal cavity therebetween; and a power roller assembly rotatably disposed within the toroidal cavity, the power roller assembly having a pivot positioned at a center of the toroidal cavity, the power roller assembly comprising:

first and second races formed with first and second bearing surfaces opposed to each other;

a plurality of rolling elements rotatable between the first and second races, the rolling elements being in contact with the first and second bearing surfaces, and an iron phosphate-based coat formed on at least one of the first and second bearing surfaces, the iron phosphate-based coat comprising a molybdenum oxide, wherein an amount of the molybdenum oxide contained in the iron phosphate-based coat, is not more than 60 mg/m$^2$ in terms of molybdenum.

20. A toroidal-type continuously variable transmission, comprising:

a pair of disks arranged in a coaxial and spaced relation to each other, the disks cooperating to form a toroidal cavity therebetween; and a power roller assembly rotatably disposed within the toroidal cavity, the power roller assembly having a pivot positioned at a center of the toroidal cavity, the power roller assembly comprising:

first and second races formed with first and second bearing surfaces opposed to each other;

a plurality of rolling elements rotatable between the first and second races, the rolling elements being in contact with the first and second bearing surfaces, and an iron phosphate-based coat formed on at least one of the first and second bearing surfaces;

wherein a surface roughness of the bearing surface with the iron phosphate-based coat is expressed by an arithmetical mean roughness (Ra) of not more than 0.07 µm.

21. A toroidal-type continuously variable transmission as claimed in claim 20, wherein a thickness of the iron phosphate-based coat is in a range of 0.4–2.0 µm.

22. A toroidal-type continuously variable transmission as claimed in claim 20, wherein the amount of iron phosphate-based coat is in a range of 100–300 mg/m$^2$ in terms of phosphorus.

23. A toroidal-type continuously variable transmission as claimed in claim 20, wherein the iron phosphate-based coat comprises a molybdenum oxide.

* * * * *